United States Patent [19]

Matheson

[11] 4,105,585

[45] Aug. 8, 1978

[54] POLYMERISATION CATALYST

[75] Inventor: Ian Alastair Matheson, Edinburgh, Scotland

[73] Assignee: BP Chemicals Limited, London, England

[21] Appl. No.: 798,178

[22] Filed: May 18, 1977

[30] Foreign Application Priority Data

May 24, 1976 [GB] United Kingdom ............... 21332/76

[51] Int. Cl.$^2$ ............................ C08F 4/64; C08F 4/66
[52] U.S. Cl. ............................ 252/429 B; 252/429 C; 252/431 R; 526/159; 526/142
[58] Field of Search ............... 252/429 B, 429 C, 430, 252/431 R

[56] References Cited

U.S. PATENT DOCUMENTS

| | | | |
|---|---|---|---|
| 3,116,274 | 12/1963 | Boehm et al. | 252/429 B X |
| 3,163,611 | 12/1964 | Andersen et al. | 252/429 B |
| 3,365,434 | 1/1968 | Coover et al. | 252/429 B X |

*Primary Examiner*—Patrick P. Garvin
*Attorney, Agent, or Firm*—Brooks, Haidt, Haffner & Delahunty

[57] ABSTRACT

A process for making a Ziegler catalyst by reacting together magnesium metal and a halogen-containing titanium compound in the presence of an alcohol. The magnesium metal is preferably magnesium powder and the alcohol preferably contains 1–6 carbon atoms. The catalyst is employed together with conventional co-catalysts.

9 Claims, No Drawings

POLYMERISATION CATALYST

The present invention relates to a process for the production of a Ziegler catalyst and to the use of the catalyst in the polymerisation olefins.

It has long been known that 1-olefins, for example, ethylene, can be polymerised by contacting them under polymerisation conditions with a catalyst comprising a transition metal compound, for example titanium tetrachloride and a co-catalyst or activator, for example triethyl aluminum. Catalysts of this type are generally referred to as Ziegler catalysts and will be so referred to throughout this specification. The catalyst and co-catalyst together are referred to as activated Ziegler catalysts. It is also known that Ziegler catalysts can be deposited on support materials, for example silicon carbide, calcium phosphate, and magnesium carbonate, chloride or hydroxide.

UK patent specification 1,411,717 disclosed a catalyst suitable for polymerising 1-olefins prepared by (a) reducing $TiCl_4$ with Mg metal to give a double chloride $TiCl_3(MgCl_2)_x$ where $x$ is 0–0.5, optionally in the presence of a support, e.g. MgO, (b) complexing the double chloride with a complexing agent, e.g. diisoamyl ether and (c) treating the product with a vanadium compound. The catalyst may be activated with an organometallic compound.

The present invention provides a process for making a Ziegler catalyst comprising reacting together magnesium metal and a halogen-containing titanium compound in the presence of an alcohol.

The magnesium metal employed in the present invention is suitably in the form of particles or granules and is preferably magnesium powder. Preferably a magnesium powder having a particle size in the range 50 to 240 mesh is employed. This corresponds to a particle size of approximately 300–60$\beta$meters, (see British Standard 410:1969 Appendix C page 31).

The halogen-containing titanium compound is suitably any titanium compound having the general formula $Ti(OR)_{4-n}X_n$ wherein $n$ has a value from 4 to 1 inclusive and wherein X is halogen, preferably chlorine and R is a hydrocarbon group, preferably an alkyl group having 1–6 carbon atoms. Examples of suitable titanium compounds are titanium tetrachloride, $Ti(OEt)_3Cl$ and $Ti(OiPr)_2Cl_2$. Titanium tetrachloride is preferred.

The quantity of halogen-containing titanium compound employed in the present invention is suitably in the range from 3 to 0.5 moles per gramme atom of magnesium metal, and preferably 1.5 to 0.9 moles per gramme atom. The presence of small amounts of unreacted magnesium metal can be tolerated in the catalyst of the present invention. The alcohol employed in the present invention is suitably a primary, secondary or tertiary aliphatic or aromatic alcohol. Preferred alcohols are those containing 1 to 6 carbon atoms for example ethanol or isopropanol. Particularly preferred are primary or secondary aliphatic alcohols. The quantity of alcohol employed in the process of the present invention is suitably 0.1 to 5, preferably 1 to 3 moles per gramme atom of magnesium metal employed.

The reaction between the magnesium metal and the halogen-containing titanium compound in the presence of the alcohol can be carried out merely by forming a mixture of the starting materials and, if necessary, applying heating or cooling to control the reaction rate. If desired, the reaction can be carried out in the presence of an inert liquid diluent, for example a liquid hydrocarbon such as cyclohexane.

It is frequently found that the produced reaction mixture contains free hydrogen chloride. This is preferably removed from the reaction mixture (e.g. by distillation) or neutralised (e.g. by adding MgO) or by successive washing and decantation or filtration employing hydrocarbon.

If the reaction product between the halogen-containing titanium compound and the magnesium metal in the presence of the alcohol contains any unreacted titanium compound or hydrocarbon soluble titanium compound it is preferred to remove such compounds. Removal of such compounds can be accomplished for example by successive washing with hydrocarbon, e.g. cyclohexane or by vacuum distillation of any volatile unreacted titanium compounds. Any free alcohol remaining in the reaction product is preferably removed before the product is employed as a Ziegler catalyst. The removal can be effected for example by the aforedescribed distillation and/or washing techniques.

The reaction of the present invention and the subsequent handling of the produced catalyst is preferably carried out in the absence of oxygen or moisture.

The present invention further provides a process for polymerising 1-olefins comprising contacting the monomer under polymerisation conditions with the Ziegler catalyst of the present invention in the presence of a Ziegler catalyst activator.

The polymerisation process according to the present invention can be applied to the polymerisation of 1-olefins e.g. ethylene or propylene or mixtures of olefins, e.g. ethylene with other 1-olefins, for example, propylene, 1-butene, 1-pentene, 1-hexene, 4-methyl pentene-1, 1-3-butadiene or isoprene. The process is particularly suitable for the polymerisation of ethylene or copolymerisation of ethylene with up to 40 weight % (based on total monomer) of comonomers i.e. one or more other 1-olefins.

Ziegler catalyst activators and the methods by which they are used to activate Ziegler catalysts are well-known. Examples of Ziegler catalyst activators are organic derivatives or hydrides of metals of Groups I, II, III and IV of the Periodic Table. Particularly preferred are the trialkyl aluminiums, e.g. triethyl or tributyl aluminum, or alkyl aluminium halides.

The polymerisation catalyst of the present invention is a solid material (insoluble in hydrocarbons) and is employed in the polymerisation process of the invention as a solid powder.

The polymerisation conditions employed can be in accordance with known techniques used in so-called supported Ziegler polymerisation processes. The polymerisation can be carried out in the gaseous phase or in the presence of a dispersion medium in which the monomer is soluble. As a liquid dispersion medium use can be made of an inert hydrocarbon which is liquid under the polymerisation conditions, or of the monomer or monomers themselves maintained in the liquid state under their saturation pressure. The polymerisation can, if desired, be carried out in the presence of hydrogen gas or other chain transfer agent to vary the molecular weight of the produced polymer.

The polymerisation is preferably carried out under conditions wherein the activated supported Ziegler catalyst is suspended in a liquid diluent so that the polymer is formed as solid particles suspended in the liquid diluent. Suitable diluents are, for example, selected from paraffins and cycloparaffins having from 3–30 carbon atoms per molecule. Examples of diluents include isopentane, isobutane, and cyclohexane. Isobutane is preferred.

The polymerisation can be carried out under continuous or batch conditions.

Methods of recovering the product polyolefin are well-known in the art.

The polymerisation catalyst of the present invention can be used to make high density ethylene polymers and copolymers at high productivity having properties which render them particularly suitable for injection moulding. However, polyethylenes ranging in molecular weight from a melt index too low to be measured to a melt index of several hundred can be made.

The invention is illustrated by the following examples:

In the Examples the melt index ($MI_{2.16}$) and high load melt index ($MI_{21.6}$) were determined according to ASTM method 1238 using 2.16 kg and 21.6 kg loads respectively; the units are grammes per 10 minutes. "MIR" is the melt index ratio $MI_{21.6}/MI_{2.16}$.

EXAMPLE 1

Mg powder (6.03g) was added to cyclohexane (150ml), stirred under an atmosphere of dry nitrogen. Isopropanol (57ml) was added, followed by the dropwise addition of titanium tetrachloride (36.4ml). The mixture turned blue after addition of about 5ml of the $TiCl_4$ and deep grey-brown after addition of a further 20ml of $TiCl_4$. The viscosity of the mixture increased as the $TiCl_4$ was added. The slurry was heated under reflux for ½ hours and the solids washed of excess titanium by successive centrifuging, decanting and addition of dry cyclohexane. The catalyst was handled as a slurry in cyclohexane (300ml) with a solids content of 63.5mg/ml. Analysis of the catalyst showed a magnesium metal content of 16.3% by weight. This was separated by dissolution of the catalyst in water, elemental magnesium being insoluble. Analysis of the water soluble portion yielded (w/w) — Ti 16.3%, Mg 8.3%, Cl 33.8%, organic residue 41.6%.

EXAMPLE 2

Mg powder (6.03g) was added to cyclohexane (150ml), stirred under an atmosphere of dry nitrogen. Isopropanol (28.5ml) was added, followed by the dropwise addition of titanium tetrachloride (18.2ml). After addition of about 5ml of the $TiCl_4$ the mixture turned blue and, as the last few milliliters were added, it turned deep grey-brown as in Example 1. The slurry was washed twice by centrifuging, decanting and addition of dry cyclohexane. The catalyst was handled as a slurry in cyclohexane (500ml) with a solids content of 31mg/ml. The magnesium metal content of the catalyst was 9.1% by weight. Analysis of the water soluble portion yielded (w/w) — Ti 17.7%, Mg 6.5%, Cl 33.5%, organic residue 42.3%.

EXAMPLE 3

Mg powder (6.03g) and cyclohexane (100ml) were stirred under an atmosphere of dry nitrogen. 10g of Merck Maglite D magnesium oxide, predried for 2 hours at 150° C under vacuum, were washed in with a further 50ml cyclohexane. 68.6ml isopropanol were added, followed by the dropwise addition 55.0ml of $TiCl_4$. The colour changed through purple to brown. After addition of all the $TiCl_4$, a further 100 ml of cyclohexane was added and the reactants heated under reflux for 1 hour. The catalyst was washed by decantation and addition of dry cyclohexane and handled as a slurry with a solids content of 45.5mg/ml. Analysis of the catalyst yielded (w/w) — Ti 10.43%, Cl 37.53%, Mg (total) 22.06%.

Polymerisation

The polymerisations were carried out in a 2.3 liter stainless steel stirred autoclave. The reactor was purged with nitrogen, heated to 70° C, and then the required quantity of catalyst slurry added with a syringe. This was followed by the triethyl aluminium co-catalyst in isobutane (1 liter). The temperature was raised to 85° C. The required pressure of hydrogen was added, followed by ethylene to bring the total pressure of the reactor contents to 41.4 bar. Ethylene was added continuously to maintain this pressure during the reaction. Polymerisation and polymer property data are shown in the Table.

TABLE 1

Ethylene Polymerisation with Magnesium Powder as a Ziegler Catalyst Support

| Catalyst Prep. | Catalyst Weight (mg) | Co-Catalyst Weight (mg) | Reaction Time (min.) | $H_2$ Partial Pressure (bar) | Catalyst Productivity (kg/kg h) | $MI_{2.16}$ (g/10 min) | MIR | Comments |
|---|---|---|---|---|---|---|---|---|
| Example 1 | 127 | 251 | 40 | 5.2 | 4 476 | 215.7 | 19.4 | Reactor pressure held at 28.6 bar by high catalyst activity. High MI and low productivity due to ethylene starvation. |
| " | 63.5 | 251 | 30 | 5.2 | 11 219 | 143.8 | 23.0 | Max. reactor pressure after 30 min was 35.2 bar. Hence low productivity and high MI. |
| " | 31.8 | 251 | 40 | 5.2 | 19 875 | 32.03 | 24.3 | Ethylene line pressure (41.4 bar) attained only after 38 min. |
| " | 12.7 | 251 | 60 | 5.2 | 26 154 | 0.54 | 33.0 | Polymer build-up at ethylene input. Low MI due to hydrogen starvation. Line pressure attained after 15 min. |
| Example 2 | 15.5 | 251 | 40 | 2.8 | 31 548 | 2.40 | 26.1 | Line pressure attained after 17 min. |
| " | 15.5 | 251 | 60 | 5.2 | 20 838 | 3.90 | 27.1 | Line pressure attained after 10 min. |
| Example 3 | 45.5 | 251 | 30 | 4.1 | 14 154 | 16.4 | 29.2 | Particle size of produced polymer was 40.3% w/w <500μm and 3.5% < 106μm. |

I claim:

1. A process for making a Ziegler catalyst comprising reacting together magnesium metal and a titanium compound having the general formula $Ti(OR)_{4-n}X_n$ wherein $n$ has a value from 4 to 1 inclusive, X is halogen and R is a hydrocarbon group, in the presence of an aliphatic alcohol having 1 to 6 carbon atoms, said titanium compound being employed in an amount of from about 3 to 0.5 moles per gramme atom of magnesium metal and said alcohol being present in an amount of from about 0.1 to 5 moles per gramme atom of magnesium metal.

2. A process as claimed in claim 1 wherein the magnesium metal is employed in the form of a powder having a particle size in the range 50 to 240 mesh.

3. A process as claimed in claim 1 wherein X is chlorine.

4. A process as claimed in claim 1 wherein the titanium compound is titanium tetrachloride.

5. A process as claimed in claim 1 wherein the titanium compound is $Ti(OEt)_3Cl$ or $Ti(OiPr)_2Cl_2$.

6. A process as claimed in claim 1 wherein the quantity of titanium compound employed is in the range 1.5 to 0.9 moles per gramme atom of magnesium metal.

7. A process as claimed in claim 1 wherein the alcohol containing 1 to 6 carbon atoms is ethanol or isopropanol.

8. A process as claimed in claim 1 wherein the quantity of alcohol employed is in the range 1.0 to 3.0 moles per gramme atom of magnesium metal.

9. A process as claimed in claim 1 wherein the reaction product is washed with a hydrocarbon solvent to remove any unreacted titanium compound and/or free alcohol before the product is employed as a Ziegler catalyst.

* * * * *

UNITED STATES PATENT AND TRADEMARK OFFICE
CERTIFICATE OF CORRECTION

PATENT NO. : 4,105,585
DATED : August 8, 1978
INVENTOR(S) : IAN ALASTAIR MATHESON It is certified that error appears in the above-identified patent and that said Letters Patent are hereby corrected as shown below:

Col. 1, line 38, after "300-60" delete the "$\beta$", and insert --$\mu$-- in lieu thereof.

Signed and Sealed this

Twenty-seventh Day of March 1979

[SEAL]

Attest:

RUTH C. MASON
Attesting Officer

DONALD W. BANNER
Commissioner of Patents and Trademarks